(12) United States Patent
Pan et al.

(10) Patent No.: US 11,681,336 B2
(45) Date of Patent: Jun. 20, 2023

(54) REMOVABLE ADHESIVE MEMBER AND DISPLAY DEVICE USING THE SAME

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); INTERFACE OPTOELECTRONICS (WUXI) CO., LTD., Wu Xi (CN); GENERAL INTERFACE SOLUTION LIMITED, Miaoli County (TW)

(72) Inventors: Chun Ting Pan, Shenzhen (CN); Feng Chun Hsieh, Shenzhen (CN); Yi Hsin Lin, Shenzhen (CN)

(73) Assignees: Interface Technology (Chengdu) Co., Ltd, Chengdu (CN); Interface Optoelectronics (Shenzhen) Co., Ltd., Shenzhen (CN); Interface Optoelectronics (Wu xi) Co., Ltd, Wuxi (CN); General Interface Solution Limited, Miaoli (TW)

( * ) Notice: Subject to any disclaimer, the term of this patent is extended or adjusted under 35 U.S.C. 154(b) by 137 days.

(21) Appl. No.: 17/375,380

(22) Filed: Jul. 14, 2021

(65) Prior Publication Data

US 2022/0397944 A1    Dec. 15, 2022

(30) Foreign Application Priority Data

Jun. 10, 2021  (CN) .......................... 202110648523.7

(51) Int. Cl.
*G06F 1/18*     (2006.01)
*B32B 37/12*    (2006.01)
*B32B 38/10*    (2006.01)

(52) U.S. Cl.
CPC .......... *G06F 1/181* (2013.01); *B32B 37/1284* (2013.01); *B32B 38/10* (2013.01); *B32B 2457/202* (2013.01); *B32B 2457/208* (2013.01)

(58) Field of Classification Search
None
See application file for complete search history.

(56) References Cited

U.S. PATENT DOCUMENTS

2015/0261345 A1* 9/2015 Hsu .......................... G06F 1/181
                                                              345/174
2020/0301483 A1* 9/2020 Hsu ............................ C09J 7/30

FOREIGN PATENT DOCUMENTS

TW      201600341 A  *  1/2016
TW      M605305 U    * 12/2020

* cited by examiner

*Primary Examiner* — Ryan Crockett
(74) *Attorney, Agent, or Firm* — Rosenberg, Klein & Lee

(57) ABSTRACT

A removable adhesive member and a display device using the same is provided. The removable adhesive member includes a first adhesive section, a first connecting section, and a tearing portion. The two opposite surfaces of the first adhesive section respectively adhere to the two objects. The first connecting section is connected to the first adhesive section. The first connecting section includes a first adhesive layer and two first protective layers. One side of the first adhesive section extends to form the first adhesive layer. The first protective layers are respectively laminated to two opposite surfaces of the first adhesive layer. The tearing portion is connected to the first adhesive section through the first connecting section, thereby avoiding rupture in pulling the tearing portion. The tearing portion is conveniently pulled up by a user, such that the first adhesive section removes from the objects to disassemble the objects.

20 Claims, 8 Drawing Sheets

REMOVABLE ADHESIVE MEMBER AND DISPLAY DEVICE USING THE SAME

This application claims priority of Application No. 202110648523.7 filed in China (P.R.C.) on 10 Jun. 2021 under 35 U.S.C. § 119; the entire contents of all of which are hereby incorporated by reference.

BACKGROUND OF THE INVENTION

Field of the Invention

The present invention relates to a technical filed for displays, particularly to a removable adhesive member and a display device using the same.

Description of the Related Art

Nowadays, notebook computers are becoming thinner and thinner. The bezel of the display is also becoming narrower and narrower, thereby achieving a high screen-to-body ratio. Even high-end products also have touch functions. However, the current technical capability of a liquid crystal display module (LCM) or a touch display module (TDM) has reached its limit in thickness and narrow bezel. Therefore, in order to achieve the visual effect of high screen-to-body ratio, the extremely narrow bezel of protective glass (CG) or a front frame is inevitable for each brand factory. As a result, when the liquid crystal display module or the touch display module is assembled with a back cover, adhesives adhere to the back iron of the backlight module (BLU) and then the backlight module adheres to the back cover through the adhesives.

FIG. 1 is a perspective view of a conventional liquid crystal display device. FIG. 2 is a cross-sectional view of a liquid crystal display device that is assembled using a conventional method. In the liquid crystal display device, a display panel 10 is mainly used as a display interface. The light source of the display panel 10 is provided by a backlight module 20. A liquid crystal display module 30 integrates the display panel 10 with the backlight module 20. In the liquid crystal display device, a front frame 40 surrounds the liquid crystal display module 30. The front frame 40 is assembled and fixed with a back cover 50. The front frame 40 is assembled with the back cover 50 using a tenon or a double-sided tape. FIG. 3 is a diagram schematically illustrating a display device with touch functions. The display device has a touch display panel 60. The touch display panel 60, protective glass 61, and the backlight module 20 are assembled into a touch display module 70. The bezel 62 of the protective glass 61 above the touch display panel 60 can adhere to the back cover 50 using a double-sided tape. The wider the width of the tape is, the stronger the adhesion is. However, the bezel 62 is relatively wide. In the conventional assembled method, the tape adheres to the periphery and occupies too many areas. Thus, the wider bezel is required.

In an adhesive assembling method, adhesives adhere to the back surface of the liquid crystal display module (i.e., adhering to the back iron of the backlight module) to combine with the back cover. Since the area of the front frame or the peripheral bezel of the protective glass where tapes adhere is reduced, the purpose of a narrow bezel can be achieved. However, after the liquid crystal display module is assembled with the back cover, the back cover or the liquid crystal display module/touch display module may need to be replaced due to quality or appearance factors. It is very difficult to disassemble the back cover and the liquid crystal display module/touch display module. This behavior will deform the backlight module and cause damage to the backlight module. Thus, the backlight module will emit light with uneven brightness (Mura) and fail to increase costs. In addition, the long working time caused by the difficulty in disassembling the modules is also one of the factors that affect the manufacturing cost.

Therefore, there is an urgent need to find a removable adhesive member and a display device using the same that facilitates to disassemble the back cover and the liquid crystal display module/touch display module, so as to solve the current problems in this technical field.

SUMMARY OF THE INVENTION

The primary objective of the present invention is to provide a removable adhesive member and a display device using the same, wherein the removable adhesive member adheres to objects, such that the objects can be rapidly disassembled without causing damage to products.

Another objective of the present invention is to provide a removable adhesive member and a display device using the same, wherein the removable adhesive member has a connecting section firmly connected between a tearing portion and an adhesive section to avoid rupture in pulling the tearing portion and to successfully proceed with a disassembling work.

To achieve the abovementioned objectives, the present invention provides a removable adhesive member. The removable adhesive member, arranged between two objects, adheres to the two objects and includes a first adhesive section, a first connecting section, and a tearing portion. The two opposite surfaces of the first adhesive section respectively adhere to the two objects. One side of the first connecting section is connected to one side of the first adhesive section. The first connecting section includes a first adhesive layer and two first protective layers. The first adhesive section extends along a first direction to form the first adhesive layer. The first protective layers are respectively laminated to two opposite surfaces of the first adhesive layer. The tearing portion is connected to one side of the first connecting section. The tearing portion is pulled up with a force to pull the first connecting section until the first adhesive section removes from the objects to disassemble the objects.

The present invention also provides a display device, which includes a back cover, a display module, and at least one removable adhesive member. The back surface of the display module is fixed to the inner surface of the back cover. The removable adhesive member includes a first adhesive section, a first connecting section, and a tearing portion. The two opposite surfaces of the first adhesive section respectively adhere to the inner surface of the back cover and the display module. One side of the first connecting section is connected to one side of the first adhesive section. The first connecting section includes a first adhesive layer and two first protective layers. The first adhesive section extends along a first direction to form the first adhesive layer. The first protective layers are respectively laminated to two opposite surfaces of the first adhesive layer. The tearing portion is connected to one side of the first connecting section. The tearing portion is pulled up with a force to pull the first connecting section until the first adhesive section removes from the display module and the back cover to disassemble the display module and the back cover.

According to an embodiment of the present invention, the first connecting section of the removable adhesive member has a length of 1~50 mm.

According to an embodiment of the present invention, the removable adhesive member further includes an extending portion connected to the first adhesive section and a second adhesive section. The extending portion includes an extending section, a second connecting section, and a third connecting section. The second connecting section and the third connecting section are respectively arranged at two sides of the extending section. One side of the second connecting section is connected to one side of the first adhesive section. One side of the third connecting section is connected to one side of the second adhesive section.

According to an embodiment of the present invention, the two opposite surfaces of the second adhesive section of the removable adhesive member respectively adhere to the two objects. The second connecting section includes a second adhesive layer and two second protective layers. The first adhesive section extends along the first direction to form the second adhesive layer. The second protective layers are respectively laminated to two opposite surfaces of the second adhesive layer. The third connecting section includes a third adhesive layer and two third protective layers. The second adhesive section extends along a second direction to form the third adhesive layer. The third protective layers are respectively laminated to two opposite surfaces of the third adhesive layer.

According to an embodiment of the present invention, the extending section of the removable adhesive member is a film layer formed by extending the second protective layers or the third protective layers or a wire fixed between the second connecting section and the third connecting section.

According to an embodiment of the present invention, one side of the extending section of the removable adhesive member toward the first direction is connected to one side of the second connecting section. One side of the extending section toward the second direction is connected to one side of the third connecting section. The first direction and the second direction are the same or different directions.

According to an embodiment of the present invention, the tearing portion of the removable adhesive member is a film layer formed by extending the first protective layers or a wire fixed to the first connecting section.

According to an embodiment of the present invention, the tearing portion of the removable adhesive member is a wire and the tearing portion is fixed to the first connecting section by penetrating through the left and right sides or upper and lower sides of the first connecting section.

According to an embodiment of the present invention, the tearing portion of the removable adhesive member is a wire. The tearing portion and the first connecting section are provided with a transitional portion therebetween. The transitional portion is formed by extending the first protective layers.

According to an embodiment of the present invention, the tearing portion of the removable adhesive member is fixed to the transitional portion by penetrating through the left and right sides or upper and lower sides of the transitional portion.

According to an embodiment of the present invention, the display device further includes a front frame with a back side thereof fixed to the periphery of the back cover. The display module is arranged within the front frame.

According to an embodiment of the present invention, the inner surface of the back cover of the display device is provided with at least one groove that accommodates the removable adhesive member.

Compared with the conventional technology, the present invention has the following advantages:

(1) The removable adhesive member of the present invention has the tearing portion that is conveniently pulled by a user. The tearing portion can reduce the difficulty and time in removing the adhesive member and facilitate to rapidly disassemble objects without causing damage to products.

(2) The removable adhesive member of the present invention has the connecting section firmly connected between the adhesive section and the tearing section. Thus, the removable adhesive member has sufficient strength to avoid rupture during a removing process, thereby facilitating to proceed with a disassembling work.

(3) The removable adhesive member of the present invention has multiple adhesive sections required for a longer adhering length, a larger adhering range, or a larger curved angle. The extending portion, connected between every two adhesive sections, reduces the area of the adhesive section and the difficulty in removing the removable adhesive member.

Below, the embodiments are described in detail in cooperation with the drawings to make easily understood the technical contents, characteristics and accomplishments of the present invention.

DETAILED DESCRIPTION OF THE INVENTION

Figure 1:
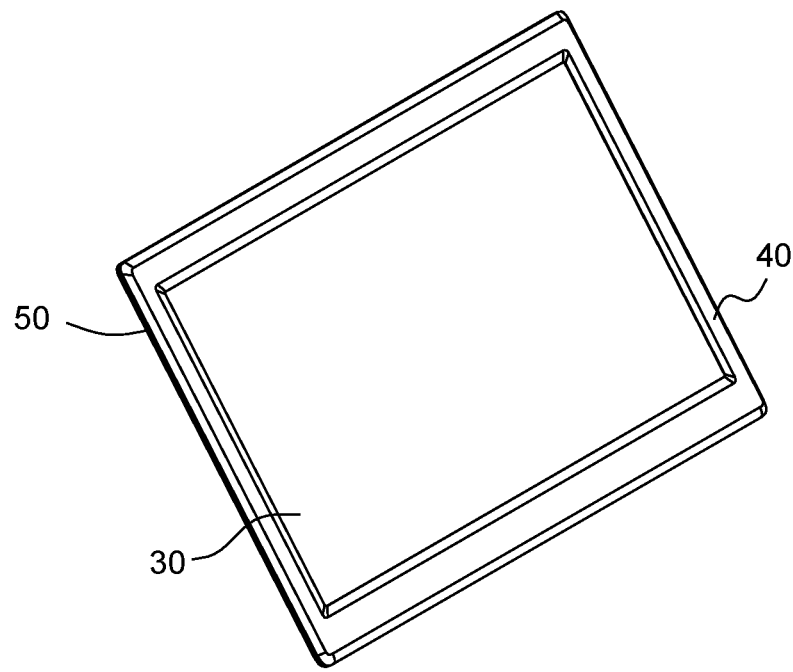
FIG. 1 is a perspective view of a conventional liquid crystal display device.
Figure 2:
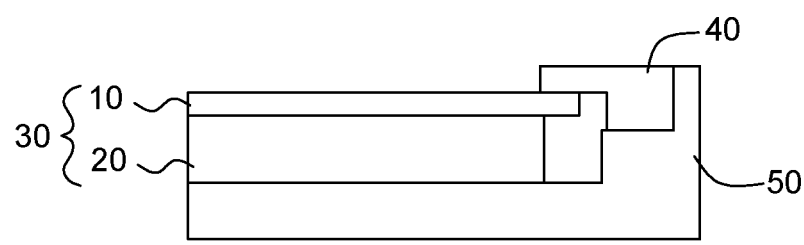
FIG. 2 is a cross-sectional view of a liquid crystal display device using a conventional assembling method.
Figure 3:
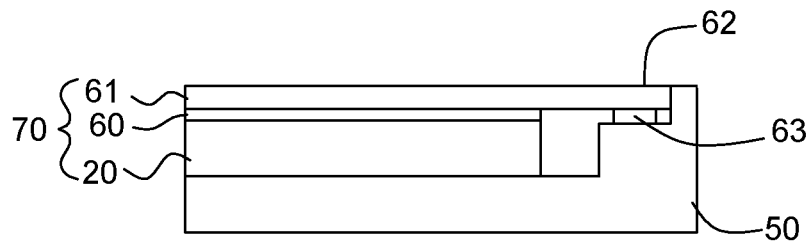
FIG. 3 is a cross-sectional view of another liquid crystal display device using a conventional assembling method.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Figure 4:
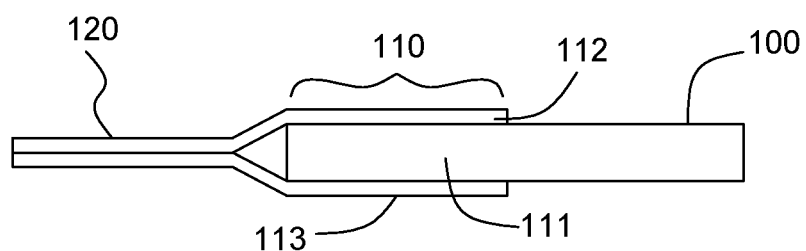
FIG. 4 is a cross-sectional view of a removable adhesive member according to a first embodiment of the present invention.

FIG. 4 is a cross-sectional view of a removable adhesive member according to a first embodiment of the present invention. Referring to FIG. 4, the removable adhesive member includes a first adhesive section 100, a first connecting section 110, and a tearing portion 120 in the embodiment. The first adhesive section 100, the first connecting section 110, and the tearing portion 120 are sequentially connected. The first adhesive section 100 is implemented with a double-sided tape. The two surfaces of the first adhesive section 100 are used to adhere to objects. One side of the first connecting section 110 is connected to one side of the first adhesive section 100. The first connecting section 110 includes a first adhesive layer 111 and two first protective layers 112 and 113. The first adhesive section 100 extends along a first direction (i.e., horizontal direction in the figure) to form the first adhesive layer 111. The first protective layers 112 and 113 are respectively laminated to the two opposite surfaces of the first adhesive layer 111. One side of the tearing portion 120 is connected to another side of the first connecting section 110. A user can conveniently catch the tearing portion 120 and pull up the tearing portion 120 with a force to pull the first connecting section 110 until the first adhesive section 100 removes from the objects, thereby removing the removable adhesive member and disassembling the objects.

In the embodiment, the tearing portion 120 includes, but not limited to, polyethylene terephthalate (PET). The tearing portion 120 is preferably made of light-weight material with certain toughness and difficultly ruptured characteristics. In the embodiment, the tearing portion 120 is a film layer formed by extending the first protective layers 112 and 113 of the first connecting section 110. In the embodiment, the first connecting section 110 has a length of 10 mm. The first adhesive section 100 has a width of 15 mm that is connected to the first connecting section 110, but the present invention is not limited thereto. The areas and the lengths of the first connecting section 110 and the first adhesive section 100 are adaptable according to requirements. For example, the first connecting section 110 may have a length of 1~50 mm. The first adhesive section 100 may have a width of 5~30 mm that is connected to the first connecting section 110. The first adhesive section 100 may have an adhering length of 10~300 mm. The tearing portion 120 may have a length of 10~500 mm. The present invention is not limited to the foregoing length or width.

When the removable adhesive member of the present invention is applied to products, the removable adhesive member may adhere to the product in a larger range or a longer length. Besides, the removable adhesive member may adhere to the product along the same direction or different directions (e.g., horizontal direction or vertical direction). In order to remove the removable adhesive member merely with the tearing portion, multiple adhesive sections can be used and an extending portion is connected to the adhesive sections along the same direction or different directions. As a result, the adhering area and strength of the adhesive section can be reduced, such that it takes less time to remove the removable adhesive member.

Figure 5A:
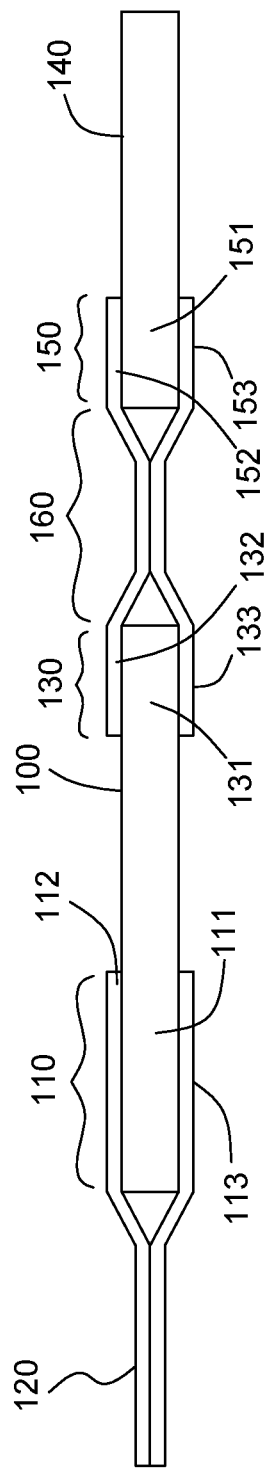
FIG. 5A is a cross-sectional view of a removable adhesive member that adheres along the same direction according to a second embodiment of the present invention.

FIG. 5A is a cross-sectional view of a removable adhesive member that adheres along the same direction according to a second embodiment of the present invention. In the embodiment, an extending portion is connected between the first adhesive section 100 and a second adhesive section 140. The extending portion, detailed as follows, includes an extending section 160, a second connecting section 130, and a third connecting section 150. The second connecting section 130 and the third connecting section 150 are respectively arranged at two sides of the extending section 160. The second embodiment also includes the tearing portion 120, the first adhesive section arranged along the first direction (i.e., horizontal direction in the figure), and the first connecting section 110 connected to one side of the second adhesive section 140. Compared with the first embodiment, the second embodiment further includes the second connecting section 130 connected to another side of the first adhesive section 100, the second adhesive section 140 arranged along the second direction (i.e., horizontal direction in the figure), and the third connecting section 150 connected to one side of the second adhesive section 140. In addition, the extending section 160 is connected between the second connecting section 130 and the third connecting section 150. The first connecting section 110 may have a length of 1~50 mm. The weaker the adhesion is, the narrower the widths of the area where the first adhesive section 100 is connected to the second connecting section 130 and the area where the second adhesive section 140 is connected to the third connecting section 150 are. The stronger the adhesion is, the wider the widths of the area where the first adhesive section 100 is connected to the second connecting section 130 and the area where the second adhesive section 140 is connected to the third connecting section 150 are. In such a case, the removable adhesive member is difficultly removed but easily ruptured. Preferably, the area where the first adhesive section 100 is connected to the second connecting section 130 and the area where the second adhesive section 140 is connected to the third connecting section 150 may have widths of 5~30 mm. The extending section 160 may have a length of 1~300 mm.

In detailed, the second adhesive section 140 of the embodiment is implemented with a double-sided tape. The two surfaces of the second adhesive section 140 adhere to objects. The second connecting section 130 includes a second adhesive layer 131 and two second protective layers 132 and 133. The first adhesive section 100 extends along the second direction (i.e., horizontal direction in the figure) to form the second adhesive layer 131. The second protective layers 132 and 133 are respectively laminated to two opposite surfaces of the second adhesive layer 131. The third connecting section 150 includes a third adhesive layer 151 and two third protective layers 152 and 153. The second adhesive section 140 extends along the second direction (i.e., horizontal direction in the figure) to form the third adhesive layer 151. The third protective layers 152 and 153 are respectively laminated to two opposite surfaces of the third adhesive layer 151. One side of the second connecting section 130 is connected to the first adhesive section 100, and another side of the second connecting section 130 is connected to one side of the extending section 160 toward the first direction. One side of the third connecting section 150 is connected to the second adhesive section 140, and another side of the third connecting section 150 is connected to another side of the extending section 160 toward the second direction. In the embodiment, the first direction and the second direction are the same directions.

Figure 5B:
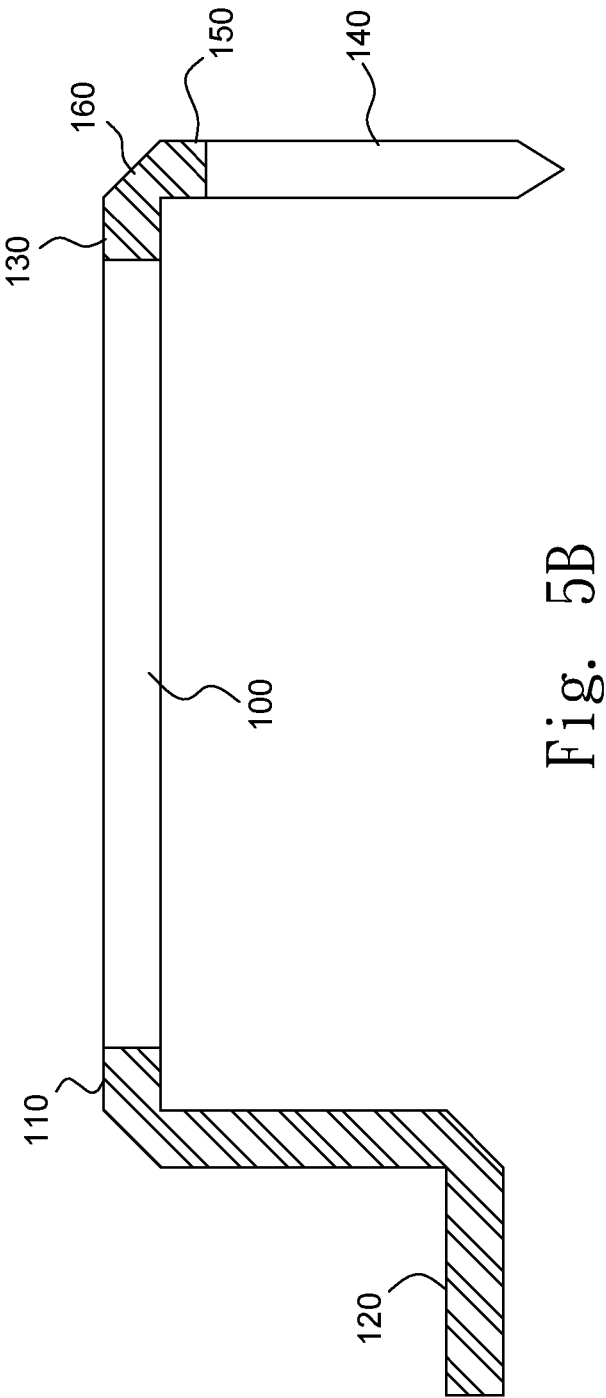
FIG. 5B is a top view of a removable adhesive member that adheres along different directions according to the second embodiment of the present invention.

In another embodiment, the first direction and the second direction may be different directions. FIG. 5B is a top view of a removable adhesive member that adheres along different directions according to the second embodiment of the present invention. Referring to FIG. 5B, the extending portion is connected between the first adhesive section 100 and the second adhesive section 140. The extending portion includes an extending section 160, a second connecting section 130, and a third connecting section 150. The second connecting section 130 and the third connecting section 150 are respectively arranged at two sides of the extending section 160. One side of the extending section 160 toward the first direction (i.e., horizontal direction in the figure) is connected to the second connecting section 130. One side of the extending section 160 toward the second direction (i.e., vertical direction in the figure) is connected to the third connecting section 150. Thus, the first adhesive section 100 and the second adhesive section 140 arranged along different directions are connected to each other. In the embodiment, the removable adhesive members adhering along different directions may be integrally formed as a piece, namely a structure having multiple bends. Alternatively, the removable adhesive member that adheres along the same direction (e.g., the embodiment in FIG. 5A) bends along different adhering directions.

In the present invention, the extending section 160 may be a film layer formed by extending the second protective layers 132 and 133 or the third protective layers 152 and 153 or a wire fixed between the second connecting section 130 and the third connecting section 150. The wire may be, but not limited to, an iron wire or a cotton thread. Besides, the tearing portion 120 may be a double layered film (e.g., the first embodiment or the second embodiment). The tearing portion 120 may be implemented with various wires such as iron wires or cotton threads, but the present invention is not limited thereto. The tearing portion 120 is made of material having good toughness and anti-pulling and difficultly ruptured characteristics.

Figure 6A:
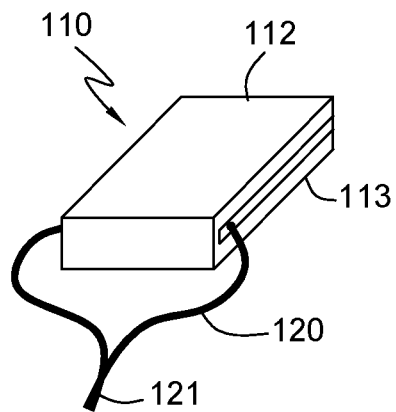
FIGS. 6A-6B are schematic diagrams illustrating a removable adhesive member that has a tearing portion connected in different ways according to a third embodiment of the present invention.
Figure 6B:
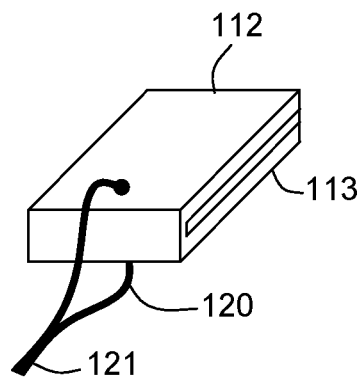

FIGS. 6A-6B are schematic diagrams illustrating a removable adhesive member that has a tearing portion connected in different ways according to a third embodiment of the present invention. As illustrated in FIG. 6A, the tearing portion 120 implemented with a wire is fixed to the first connecting section 110 by penetrating through the left and right sides of the first connecting section 110. As illustrated in FIG. 6B, the first protective layers 112 and 113 on the top and bottom of the first connecting section 110 are bored to form holes. Thus, the tearing portion 120 is fixed to the first connecting section 110 by penetrating through the upper and lower sides of the first connecting section 110. After the wire penetrates through the first connecting section 110, the head and tail ends of the wire can be bundled together to form the hand-held end of the tearing portion 120. In the embodiment, the first protective layers 112 and 113 are connected to have a U shape that covers the left, upper, and lower sides of the first adhesive layer 111, lest the first connecting section 110 easily rupture. When the tearing portion 120 is pulled up with a force, the U-shaped protective layer resists the corresponding force rather than easily ruptures.

Figure 7:
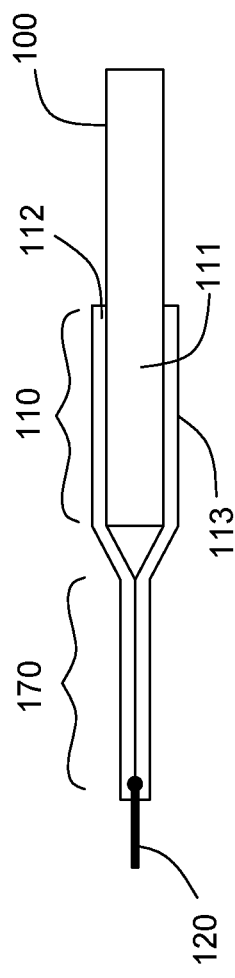
FIG. 7 is a cross-sectional view of a removable adhesive member according to a fourth embodiment of the present invention.

In order to improve the anti-pulling strength, the tearing portion 120 and the first connecting section 110 are provided with a transitional portion therebetween. FIG. 7 is a cross-sectional view of a removable adhesive member according to a fourth embodiment of the present invention. In the embodiment, the tearing portion is implemented with a wire. The transitional portion 170 is formed by extending the first protective layers 112 and 113. Like the third embodiment, the tearing portion 120 is fixed to the transitional portion 170 by penetrating through the left and right sides or upper and lower sides of the transitional portion 170.

When the tearing portion 120 is implemented with a wire, multiple adhesive sections of the removable adhesive member are connected through an extending portion along the same direction or different directions. Thus, the removable adhesive member may adhere to an object in a longer length or a larger range. Besides, the removable adhesive member may adhere to an object along the same direction or different directions. The removable adhesive member is removed merely with the tearing portion. As a result, the adhering area and strength of the adhesive section can be reduced, such that it takes less time to remove the removable adhesive member.

Figure 8:
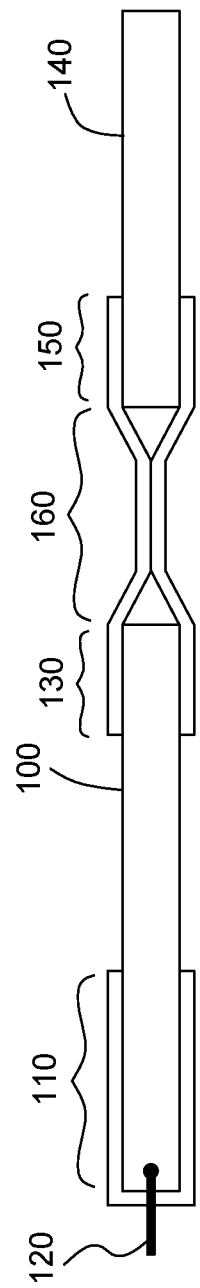
FIG. 8 is a cross-sectional view of a removable adhesive member according to a fifth embodiment of the present invention.

FIG. 8 is a cross-sectional view of a removable adhesive member according to a fifth embodiment of the present invention. In the embodiment, the tearing portion 120 is implemented with a wire. The tearing portion 120 is fixed to the first connecting section 110. The first connecting section 110 is connected to one side of the first adhesive section 100 along the first direction (i.e., horizontal direction in the figure), and another side of the first adhesive section 100 is connected to the second connecting section 130. In addition, the second adhesive section 140 is connected to the third connecting section 150 along the second direction (i.e., horizontal direction in the figure). The extending section 160 is connected between the second connecting section 130 and the third connecting section 150. The extending section 160 may be implemented with a wire fixed between the second connecting section 130 and the third connecting section 150, but the present invention is not limited thereto. The extending section 160 implemented with a wire is connected to the second connecting section 130 and the third connecting section 150 by penetrating through the upper and lower sides or the left and right sides of the second connecting section 130 and the third connecting section 150, but the present invention is not limited thereto. In the embodiment, the first direction and the second direction are the same directions. Alternatively, the first direction and the second direction may be different directions. This case has been described in the second embodiment previously so will not be reiterated. In the embodiment, the first protective layers 112 and 113 of the first connecting section 110 may be connected to have a U shape that covers the left, upper, and lower sides of the first adhesive layer 111. When the tearing portion 120 is pulled up with a force, the U-shaped protective layer that covers the first adhesive layer 111 can resist the corresponding force rather than easily rupture.

As mentioned above, the tearing portion 120 of the present invention is not limited to a film layer or a wire. The tearing portion 120 is made of material having toughness and difficultly ruptured characteristics. The material of the tearing portion 120 depends on requirements of products. The tearing part 120 usually needs to be exposed outside the product in order to conveniently catch and tear off the tearing portion 120. Some products such as notebook computers need to hide the tearing portions. The wire is softer than the film layer and easily hidden in these products. Moreover, the wire is easily shaped and arranged. The wire is easily designed to have angles and able to bend. On the contrary, it is time-consuming to accurately design a film layer.

The removable adhesive member of the present invention can be further applied to a display device, such as the liquid crystal display device of a notebook computer or a tablet computer, a light emitting display device, or an organic light emitting display device. The removable adhesive member is especially used as a back adhesive on the back of the display device. Thus, the display device is assembled with a back cover through the removable adhesive member, such that they can be rapidly disassembled without causing damage to the products.

Figure 9:
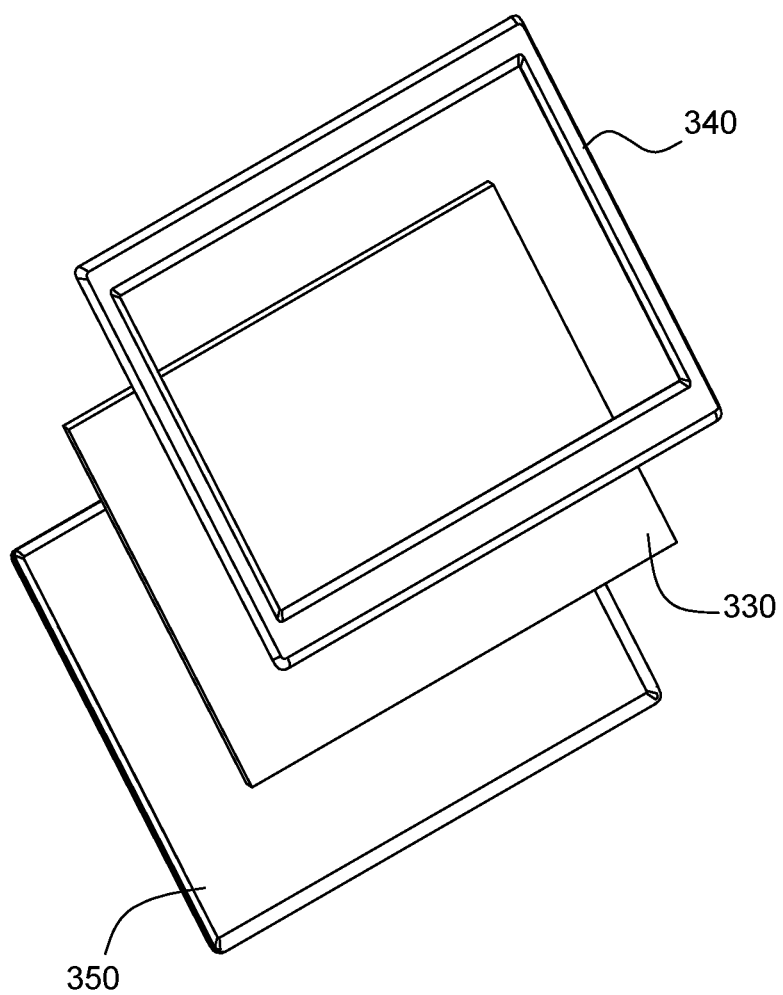
FIG. 9 is a perspective view of a display device according to a sixth embodiment of the present invention.
Figure 10A:
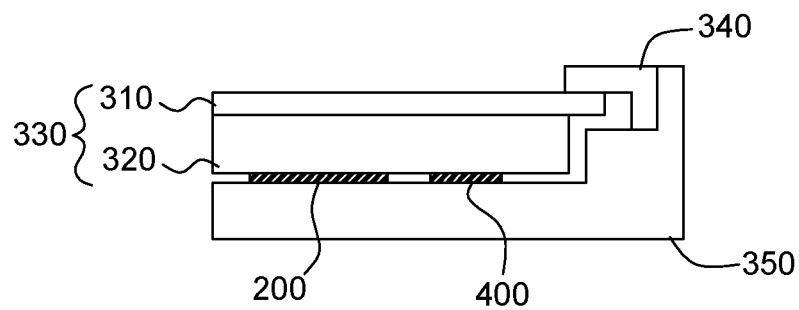
FIG. 10A is a cross-sectional view of a display device according to the sixth embodiment of the present invention.
Figure 10B:
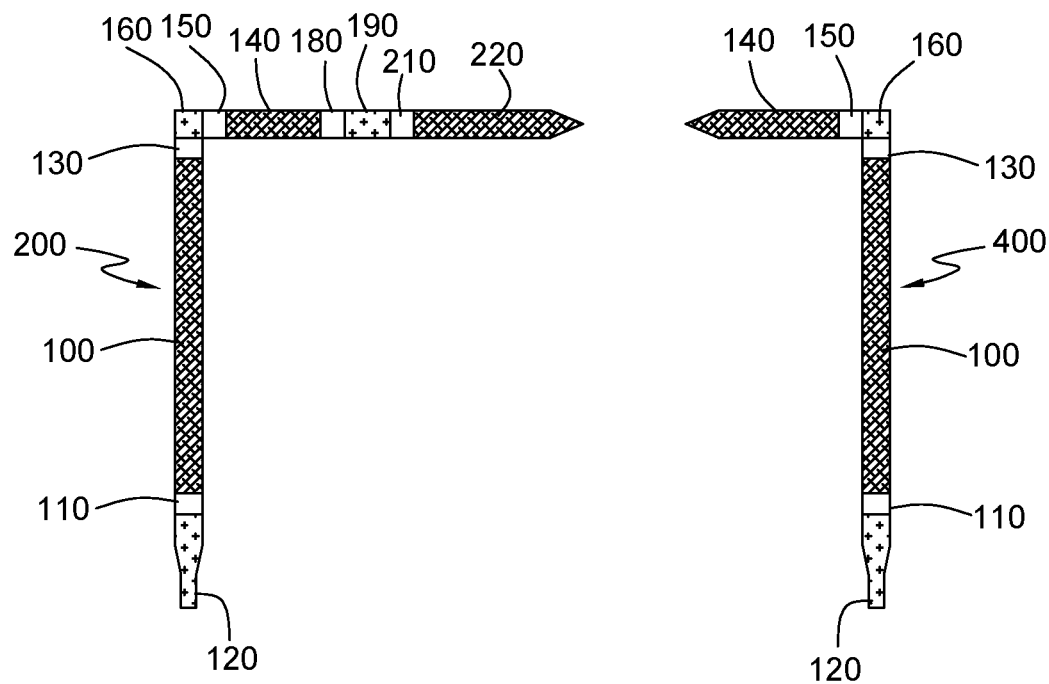
FIG. 10B is a perspective view of a display device according to the sixth embodiment of the present invention.

FIG. 9 is a perspective view of a display device according to a sixth embodiment of the present invention. FIG. 10A is a cross-sectional view of a display device according to the sixth embodiment of the present invention. FIG. 10B is a perspective view of a display device according to the sixth embodiment of the present invention. Referring to FIG. 9, FIG. 10A, and FIG. 10B, removable adhesive members 200 and 400 are used as back adhesives for the display device in the embodiment. Using the adhesive assembling method, a display module 330 is assembled with a back cover 350 and assembled within a front frame 340. The back side of the front frame 340 can be fixed to the periphery of the back cover 350 through a tenon or a double-sided tape, such that the front frame 340 is assembled with the back cover 350. The display module 330 includes a display panel 310 and a backlight module 320. The display panel 310 is used as a display interface. The light source of the display panel 310 is provided by the backlight module 320. As illustrated in FIG. 10A and FIG. 10, the removable adhesive member 200 adheres to the left inner surface of the back cover 350 and has the tearing portion 120. The tearing portion 120 is sequentially connected to the first connecting section 110 and the first adhesive section 100 along the second direction (i.e., vertical direction in the figure). The first adhesive section 100 is a double-sided tape. One surface of the double-sided tape adheres to the inner surface of the back cover 350 and another surface of the double-sided tape adheres to the display module 330. Thus, the double-sided tape adheres to the back cover 350 and the display module 330. Besides, the embodiment uses the extending portion connected between the first adhesive section 100 and the second adhesive section 140, wherein the extending portion includes the extending section 160, the second connecting section 130, and the third connecting section 140. The second connecting section 130 and the third connecting section 140 are arranged at two sides of the extending section 160. Also, the embodiment uses an extending portion connected between the second adhesive section 140 and a third adhesive section 220, wherein the extending portion includes an extending section 190, a fourth connecting section 180, and a fifth connecting section 210. The fourth connecting section 180 and the fifth connecting section 210 are arranged at two sides of the extending section 190. In detailed, one side of the first adhesive section 100 opposite to the first connecting section 110 is connected to the second connecting section 130. One side of the second adhesive section 140 toward the first direction (i.e., horizontal direction in the figure) is connected to the third connecting section 150. The second connecting section 130 and the third connecting section 150 are respectively connected to two sides of the extending section 160, such that the removable adhesive member 200 adheres to an object along different directions. On top of that, another side of the third connecting section 140 is connected to the fourth connecting section 180 and then connected to the fifth connecting section 210 through the extending section 190 along the first direction. The fifth connecting section 210 is connected to the third adhesive section 220, thereby lengthening a range where the removable adhesive member 200 adheres to an object. Besides, the removable adhesive member 400 adheres to the right inner surface of the back cover 350 and uses an extending portion to connect along different directions, thereby adhering to an object along different directions and enlarging an adhering range.

Figure 10C:
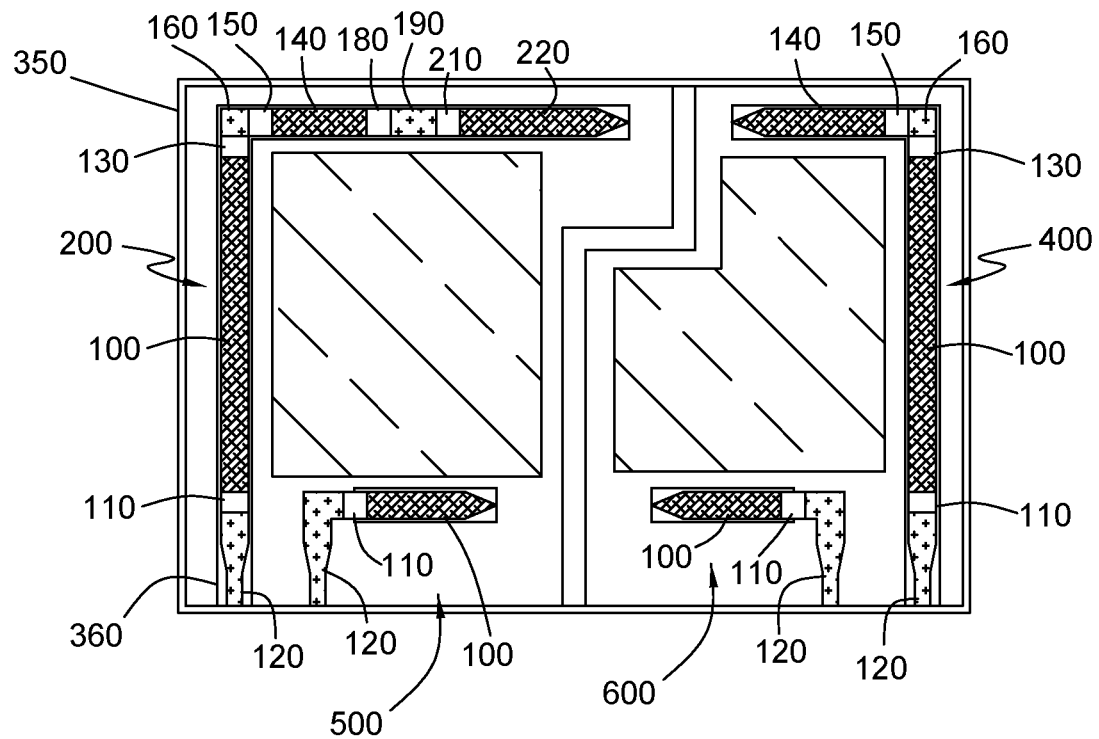
FIG. 10C is a schematic diagram illustrating a removable adhesive member that adheres to a back cover according to the sixth embodiment of the present invention.

FIG. 10C is a schematic diagram illustrating a removable adhesive member that adheres to a back cover according to the sixth embodiment of the present invention. Referring to FIG. 10C, the inner surface of the back cover 350 is provided with multiple grooves 360 that respectively accommodate removable adhesive members 200, 400, 500, and 600. Thus, the inner surface of the back cover 350 adheres to the back surface (i.e., the back iron of the backlight module 320 in FIG. 10A) of the display module 330 through the removable adhesive members 200, 400, 500, and 600. The removable adhesive member 200 includes the first adhesive section 100, the second adhesive section 140, and the third adhesive section 220, uses an extending portion (including the extending section 160, the second connecting section 130, and the third connecting section 150, wherein the second connecting section 130 and the third connecting section 150 are respectively arranged at two sides of the extending section 160) to adhere to an object along different directions, and uses another extending portion (including the extending section 190, the fourth connecting section 180, and the fifth connecting section 210, wherein the fourth connecting section 180 and the fifth connecting section 210 are respectively arranged at two sides of the extending section 190) to adhere to an object along the same direction. The removable adhesive member 400 includes the first adhesive section 100 and the second adhesive section 140 and uses the extending section 160 to adhere to an object along the same direction. Each of the removable adhesive members 500 and 600 includes the tearing portion 120, the first connecting section 110, and the first adhesive section 100. When the display module 330 and the back cover 350 are disassembled, a user simply pulls up the tearing portions 120 of the removable adhesive members 200, 400, 500, and 600 with a force, thereby pulling all of the connecting sections and the adhesive sections. Finally, the removable adhesive members 200, 400, 500, and 600 are removed from the display module 330 and the back cover 350 to complete a disassembling work.

Figure 11:
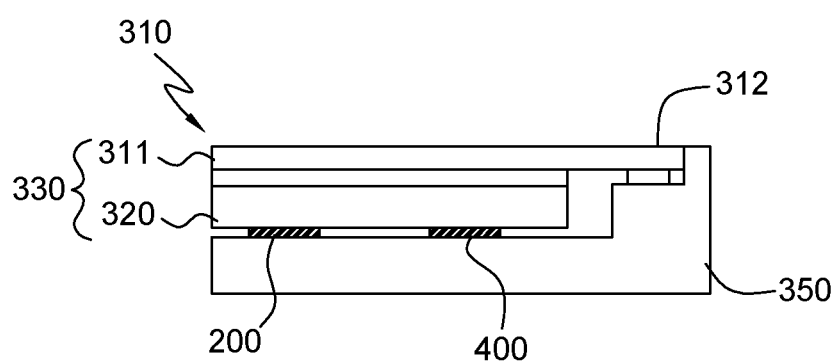
FIG. 11 is a cross-sectional view of a display device according to a seventh embodiment of the present invention.

FIG. 11 is a cross-sectional view of a display device according to a seventh embodiment of the present invention. Refer to FIG. 11. Compared with the sixth embodiment, the display panel 310 of the display device of the seventh embodiment is a touch display panel with touch functions. The bezel 312 of protective glass 311 that forms the surface of the display panel 310 adheres to the periphery of the back cover 350. Similarly, the inner surface of the back cover 350 adheres to the back surface of the display module 330 (i.e., the back iron of the backlight module 320) through at least one removable adhesive member 200. Thus, the display module 330 is fixed to the back cover 350. The removable adhesive member 200 facilitates to rapidly disassemble the display module 330 and the back cover 350 without causing damage to products.

In conclusion, the removable adhesive member of the present invention includes the tearing portion, the connecting section, and the adhesive section. The tearing portion is conveniently pulled by a user to remove the removable adhesive member. The tearing portion can reduce the difficulty and time in removing the adhesive member. Besides, the connecting section is firmly connected between the adhesive section and the tearing section, so as to avoid rupture during a removing process, thereby facilitating to proceed with a disassembling work. Additionally, the removable adhesive member of the present invention has multiple adhesive sections required for a longer adhering length, a larger adhering range, or a larger curved angle. The extending portion, connected between every two adhesive sections, reduces the area of the adhesive section and the difficulty in removing the removable adhesive member.

The removable adhesive member of the present invention is suitable for assembling the display device. The removable adhesive member is especially suitable for adhering to the back cover and the display module using the adhesive assembling method. The display module may be a liquid crystal display module or a touch display module. When the back cover and the display module are disassembled, the removable adhesive member is easily removed to facilitate to rapidly disassemble products without causing damage to the products.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A removable adhesive member, arranged between two objects, adhering to the two objects and comprising:
    a first adhesive section with two opposite surfaces thereof respectively adhering to the two objects;
    a first connecting section with one side thereof connected to one side of the first adhesive section, the first connecting section comprises a first adhesive layer and two first protective layers, the first adhesive section extends along a first direction to form the first adhesive layer, and the first protective layers are respectively laminated to two opposite surfaces of the first adhesive layer;
    a tearing portion connected to one side of the first connecting section, wherein the tearing portion is pulled up with a force to pull the first connecting section until the first adhesive section removes from the objects to disassemble the objects; and
    an extending portion connected to the first adhesive section and a second adhesive section, the extending portion comprises an extending section, a second connecting section, and a third connecting section, the second connecting section and the third connecting section are respectively arranged at two sides of the extending section, one side of the second connecting section is connected to another side of the first adhesive section, and one side of the third connecting section is connected to one side of the second adhesive section.

2. The removable adhesive member according to claim 1, wherein the first connecting section has a length of 1~50 mm.

3. The removable adhesive member according to claim 1, wherein two opposite surfaces of the second adhesive section respectively adhere to the two objects, the second connecting section comprises a second adhesive layer and two second protective layers, the first adhesive section extends along the first direction to form the second adhesive layer, the second protective layers are respectively laminated to two opposite surfaces of the second adhesive layer, the third connecting section comprises a third adhesive layer and two third protective layers, the second adhesive section extends along a second direction to form the third adhesive layer, and the third protective layers are respectively laminated to two opposite surfaces of the third adhesive layer.

4. The removable adhesive member according to claim 3, wherein the extending section is a film layer formed by extending the second protective layers or the third protective layers or a wire fixed between the second connecting section and the third connecting section.

5. The removable adhesive member according to claim 1, wherein one side of the extending section toward the first direction is connected to one side of the second connecting section, one side of the extending section toward the second direction is connected to one side of the third connecting section, and the first direction and the second direction are same or different directions.

6. The removable adhesive member according to claim 1, wherein the tearing portion is a film layer formed by extending the first protective layers or a wire fixed to the first connecting section.

7. The removable adhesive member according to claim 6, wherein the tearing portion is a wire and the tearing portion is fixed to the first connecting section by penetrating through left and right sides or upper and lower sides of the first connecting section.

8. The removable adhesive member according to claim 6, wherein the tearing portion is a wire, the tearing portion and the first connecting section are provided with a transitional portion therebetween, and the transitional portion is formed by extending the first protective layers.

9. The removable adhesive member according to claim 8, wherein the tearing portion is fixed to the transitional portion by penetrating through left and right sides or upper and lower sides of the transitional portion.

10. A display device comprising:
    a back cover;
    a display module with a back surface thereof fixed to an inner surface of the back cover; and
    at least one removable adhesive member comprising:
        a first adhesive section with two opposite surfaces thereof respectively adhering to the inner surface of the back cover and the display module;
        a first connecting section with one side thereof connected to one side of the first adhesive section, the first connecting section comprises a first adhesive layer and two first protective layers, the first adhesive section extends along a first direction to form the first adhesive layer, and the first protective layers are respectively laminated to two opposite surfaces of the first adhesive layer; and
        a tearing portion connected to one side of the first connecting section, wherein the tearing portion is pulled up with a force to pull the first connecting section until the first adhesive section removes from the display module and the back cover to disassemble the display module and the back cover;
    wherein the removable adhesive member further comprises an extending portion connected to the first adhesive section and a second adhesive section, the extending portion comprises an extending section, a second connecting section, and a third connecting section, the second connecting section and the third connecting section are respectively arranged at two sides of the extending section, one side of the second connecting section is connected to another side of the first adhesive section, and one side of the third connecting section is connected to one side of the second adhesive section.

11. The display device according to claim 10, further comprising a front frame with a back side thereof fixed to a periphery of the back cover and the display module is arranged within the front frame.

12. The display device according to claim 10, wherein the inner surface of the back cover is provided with at least one groove that accommodates the at least one removable adhesive member.

13. The display device according to claim 10, wherein the first connecting section has a length of 1~50 mm.

14. The display device according to claim 10, wherein the second connecting section comprises a second adhesive layer and two second protective layers, the first adhesive section extends along the first direction to form the second adhesive layer, the second protective layers are respectively laminated to two opposite surfaces of the second adhesive layer, the third connecting section comprises a third adhesive layer and two third protective layers, the second adhesive section extends along a second direction to form the third adhesive layer, and the third protective layers are respectively laminated to two opposite surfaces of the third adhesive layer.

15. The display device according to claim 14, wherein the extending section is a film layer formed by extending the second protective layers or the third protective layers or a wire fixed between the second connecting section and the third connecting section.

16. The display device according to claim 10, wherein one side of the extending section toward the first direction is connected to one side of the second connecting section, one side of the extending section toward the second direction is connected to one side of the third connecting section, and the first direction and the second direction are same or different directions.

17. The display device according to claim 10, wherein the tearing portion is a film layer formed by extending the first protective layers or a wire fixed to the first connecting section.

18. The display device according to claim 17, wherein the tearing portion is a wire and the tearing portion is fixed to the first connecting section by penetrating through left and right sides or upper and lower sides of the first connecting section.

19. The display device according to claim 17, wherein the tearing portion is a wire, the tearing portion and the first connecting section are provided with a transitional portion therebetween, and the transitional portion is formed by extending the first protective layers.

20. The display device according to claim 19, wherein the tearing portion is fixed to the transitional portion by penetrating through left and right sides or upper and lower sides of the transitional portion.

* * * * *